United States Patent

Brewer et al.

[15] 3,700,320

[45] Oct. 24, 1972

[54] AUTOMATIC SEARCHING SYSTEM

[72] Inventors: Waldo L. Brewer; Joseph F. Laukaitis, both of Rochester, N.Y.

[73] Assignee: Eastman Kodak Company, Rochester, N.Y.

[22] Filed: Sept. 3, 1970

[21] Appl. No.: 69,201

[52] U.S. Cl. ........................353/26, 226/43, 226/48, 235/61.11 D, 235/61.11 E, 235/92 R, 250/219 FR, 340/172.5, 340/173 LM, 340/174.1 C

[51] Int. Cl.........G03b 23/12, G11b 5/00, G06k 7/00

[58] Field of Search.......353/26; 226/48; 250/219 D, 250/219 Q, 219 CR, 219 FR; 235/61.11, 92 V; 340/173, 174, 174.1 C, 172.5

[56] References Cited

UNITED STATES PATENTS

| | | |
|---|---|---|
| 3,375,507 | 3/1968 | Gleim et al..........340/174.1 C |
| 3,290,987 | 12/1966 | James et al. .................353/26 |
| 2,923,921 | 2/1960 | Shapin.......................340/174 |

*Primary Examiner*—Leonard Forman
*Assistant Examiner*—Steven L. Stephan
*Attorney*—Walter O. Hodsdon and Robert F. Cody

[57] ABSTRACT

An automatic searching system, say for use with microfilm strips, hybridizes magnetic and optical searching techniques: Magnetically recorded descriptor data is not positioned relative to respective frames; and instead, magnetic frame address data is associated with descriptor data. A counter, under optical control, keeps track of frames which pass a reference (viewer) location; and a code-and-counter combination serves as an efficient frame-count keeper.

7 Claims, 3 Drawing Figures

Patented Oct. 24, 1972

3,700,320

2 Sheets-Sheet 1

Figure 1:
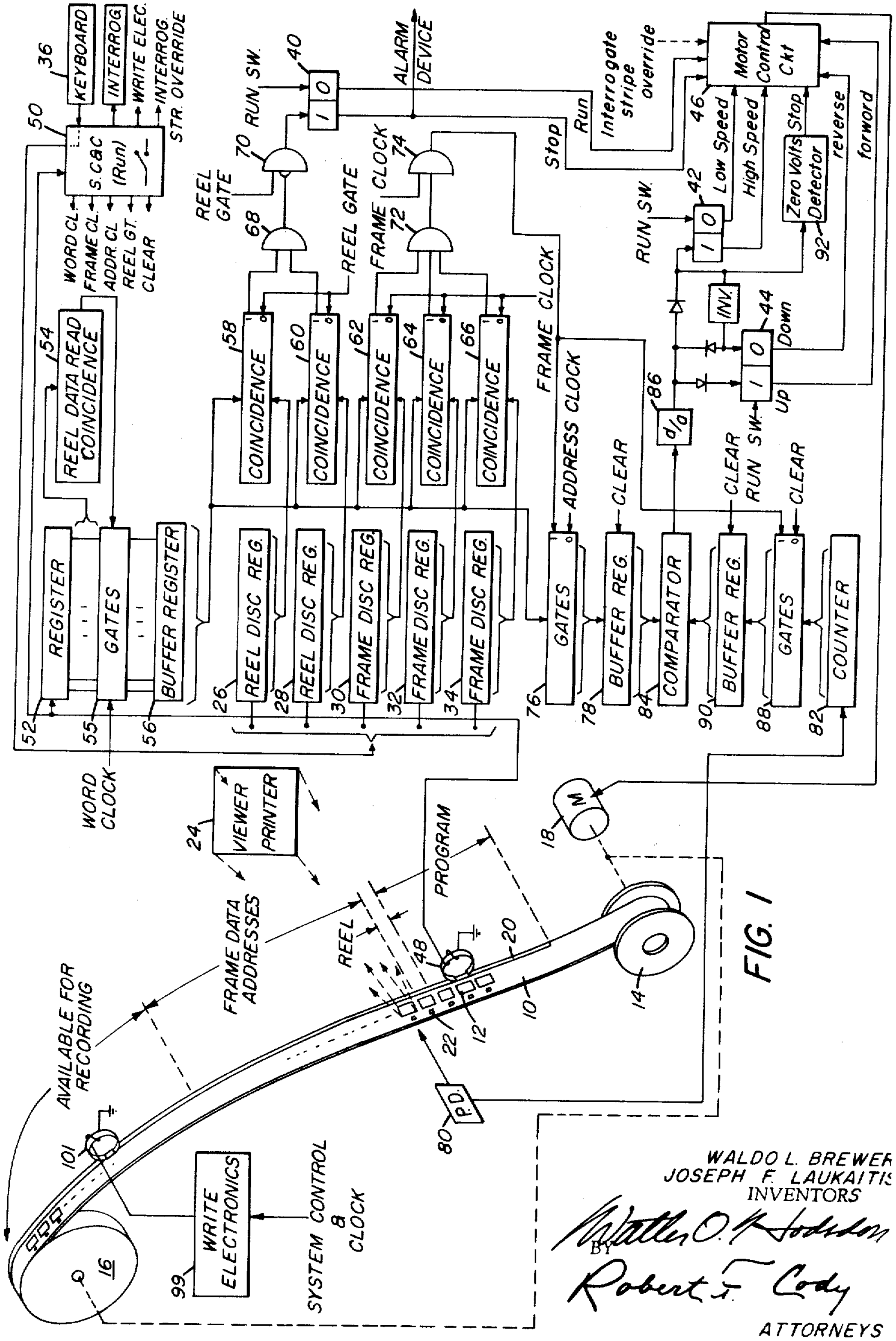

WALDO L. BREWER
JOSEPH F. LAUKAITIS
INVENTORS

BY Walter O. Hodsdon
Robert F. Cody
ATTORNEYS

Patented Oct. 24, 1972 3,700,320

2 Sheets-Sheet 2

WALDO L. BREWER
JOSEPH F. LAUKAITIS
INVENTORS
BY Walter O. Hodsdon
Robert F. Cody
ATTORNEYS

AUTOMATIC SEARCHING SYSTEM

BACKGROUND OF THE INVENTION

1. Field of the Invention

This invention relates in general to automatic searching and data retrieval systems; and in particular, the invention provides improved apparatus for indexing — and otherwise using — strips of microfilmed documents or the like.

2. Description Relative to the Prior Art

U.S. Pat. Nos. 2,923,921 and 3,290,987 indicate two well-known ways to search automatically data which have been recorded on a microfilm strip: U.S. Pat. No. 2,923,921 describes the use of a magnetic stripe that records identifying data directly alongside, or a predetermined distance from, corresponding microfilm frames in a strip thereof, positioning and control of such film strip being by means of the magnetic stripe; and U.S. Pat. No. 3,290,987 describes the use of optical codes, and marks, for the same purpose.

Whereas a magnetic stripe intrinsically is capable of storing large quantities of identifying data for each microfilm frame in a strip thereof, position-control of such strip by means of such stripe leaves much to be desired because reading magnetically recorded information (usually) requires that such information pass a magnetic read head at a constant, fairly low (about 30 inches per second), speed.

The optical recording of frame identifying data, and control marks, along a microfilm strip, however, while permitting faster reading of such data (about 100 inches per second), and precise position-control of such strip, suffers from the fact that only (fairly) small amounts of identifying data can be optically recorded for each of the frames in the strip.

SUMMARY OF THE INVENTION

To avoid the shortcomings of the prior art, the invention proposes in an automatic searching system for use with strips of microfilmed data or the like:

First, that frame identifying data be recorded magnetically, and that strip positioning be effected by optical means, thereby to obtain all of the advantages, and none of the disadvantages, of prior art searching techniques;

Second, that for the sake of efficiency and versatility, magnetically recorded data not be positioned in any special relationship with respect to respective microfilm frames, but instead that such magnetically recorded data include therewith a respective frame address for each of its sets of frame identifying data.

(Such a technique permits the close packing of large quantities of identifying data along the length of the magnetic stripe, whereby computer programs and other additional data may also be recorded within the stripe; permits high speed optical indexing, by frame-count keeping, once the address of a desired frame has been "magnetically" identified; and permits slow speed optical zeroing of the desired frame to a reference location for viewing, printing, or the like.)

Third, that frame-count keeping in a system as described briefly above be by means of a counter, the least significant stages of which are effectively replaced by a code count appearing on the microfilm strip, thereby practically eliminating any chance that a wrong count can be made while frame-count keeping.

OBJECTS OF THE INVENTION

To increase the efficiency and versatility of automatic searching systems, especially those useful with data on strips of microfilm; and effectively to prevent a "wrong frame" from ever being indexed to a reference location because of a failure to keep proper count of the frames which have passed such location.

Figure 2:
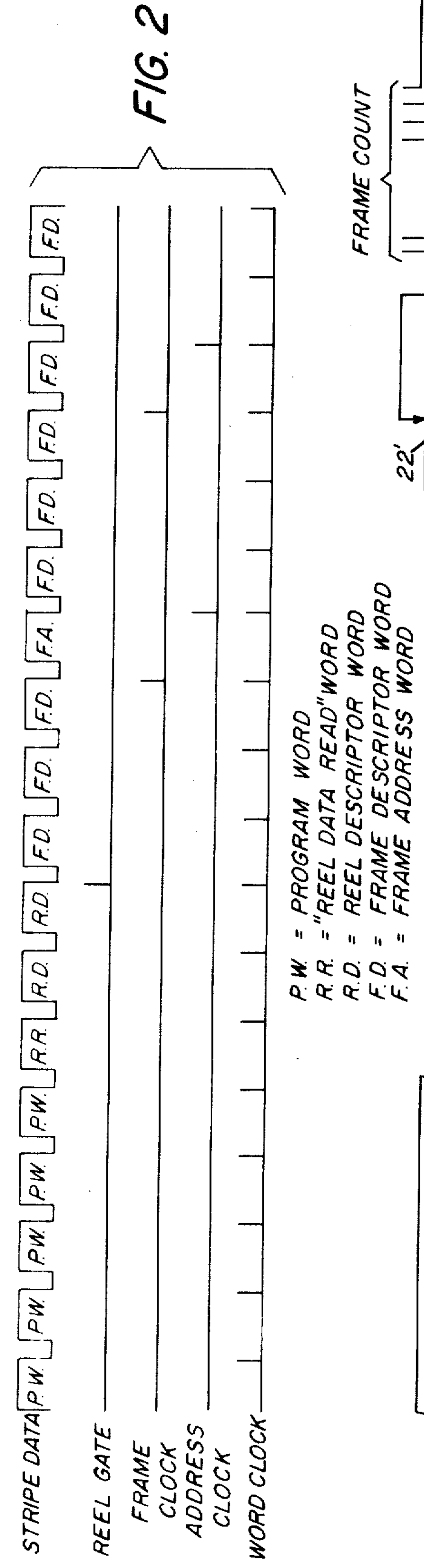
Figure 4:
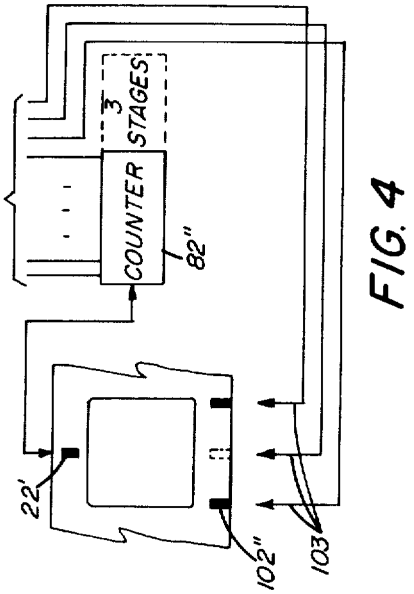
Figure 3:
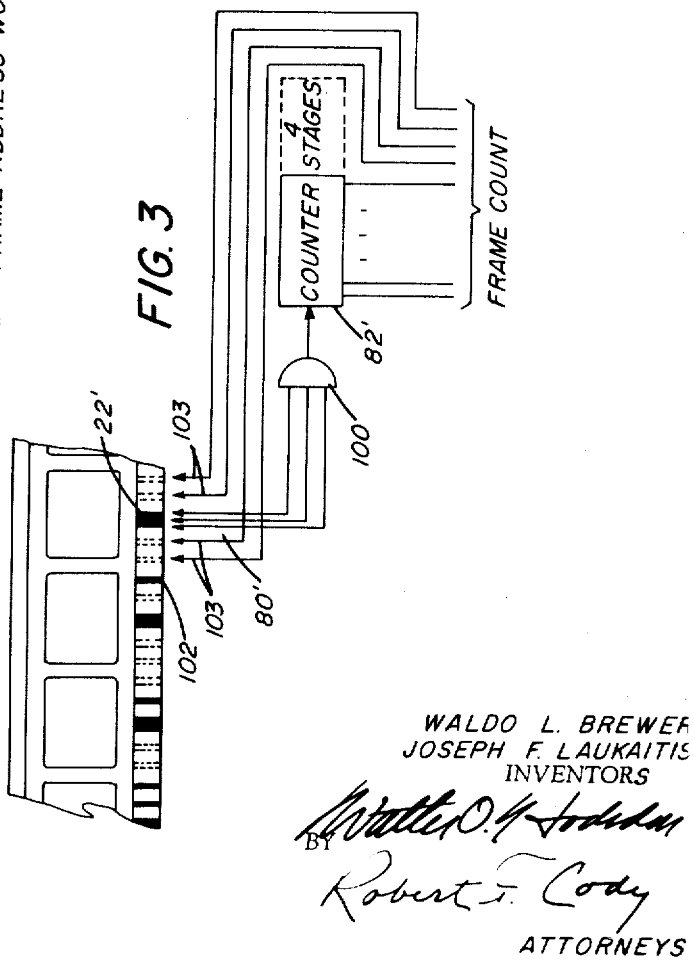

The invention will be described with reference to the figures, wherein:

FIG. 1 is a logical block diagram, partially in perspective, illustrating apparatus embodying the invention, FIG. 2 illustrates a series of diagrams useful for describing the invention, and FIGS. 3 and 4 illustrate frame-count keeping techniques according to the invention.

Reference should be had to FIGS. 1 and 2:

A microfilm strip 10 having frames 12 is supported between first and second reels 14,16; and such reels are similarly driven in either a clockwise or a counterclockwise direction, by means of a motor 18, thereby to position the strip 10. The frames 12 may contain, for example, microfilmed images of documents or the like; and the film strip drive may take any of a variety of forms.

The film strip 10 is provided with a magnetic recording stripe 20 along its length; and optical marks 22 adjacent each frame 12. As used herein, the term "stripe" shall be taken to mean any magnetic recording medium, of any width, that is coated along the length of the strip 10. The magnetic recording stripe 20 typically stores a computer program at its lead end; followed by data generally descriptive of, say, documents recorded in the strip 10; followed by data respectively descriptive of, and locating each of, such recorded documents along the length of the strip 10 (there being no necessary correspondence between the positionings of such data and their respective documents); followed by a portion of the stripe 20 within which frame-related or other data may be recorded. See FIG. 2, which indicates the above-described arrangement of data within the stripe 20, simplified, however, to facilitate the description which follows; and although such description indicates a logical arrangement of circuit components for implementing the invention, it will be appreciated that such arrangement may take a number of forms, typical of which would be a general purpose computer which has been programmed, for example, by means of data read from the stripe 20:

To search the microfilm strip 10 so that a given microfilmed document may be brought into registry with a viewer 24 (or film printer, etc.), data broadly (reel data) and specifically (frame data) descriptive of such document is inserted into registers 26,28,30,32,34 by means of a keyboard 36 or similar device. Then, scanning the magnetic stripe is started by actuation of a switch 38 that sets flip-flops 40,42,44 to their respective RUN, LOW, and FORWARD states, thereby to cause a motor control circuit 46 to drive the motor 18 at low speed in a forward direction. The motor control circuit may take any of a variety of forms.

Initially, the computer program is read by means of a read head 48, and applied to a system control and clock unit 50 — for controlling the many and various functions ancillary to practicing the invention — and to a register 52. During the time that the computer program is being applied to the system control and clock unit 50, the (parallel) output of the register 52 is effectively disabled. As soon, however, as the program has passed the read head 48, a code word — e.g. a series of recorded ONE's — passes under the read head 48 (See FIG. 2); and by comparing such code word with a memorized word in code form (e.g. via a register-coincidence circuit 54), gates 55 are set so that they may thereafter be cyclically opened in response to a word-clock pulse train: the data word in a buffer register 56 cooperative to receive the output of the register 52 via the gates 55, thus, cyclically changes at the word clock rate. The output words of the buffer register 56 are applied to digital coincidence circuits 58,60,62,64,66, as are the respective outputs of the registers 26,28,30,32,34; and such coincidence circuits are disposed to produce ONE outputs whenever their respective paired inputs are the same.

Assuming the computer program and the "reel data read" word have been read by the head 48, and assuming that the next two (reel descriptor) words which are read are the same as those inserted into the registers 26,28, the coincidence circuits 58,60 both produce ONE outputs, which cause an AND circuit 68 to produce an output. The AND circuit 68 output inhibits a gate 70 — cooperative with the flip-flop 40 — from producing an output; and thus, the motor 18 continues to run at low speed.

Were, say, the wrong reel to have been set up for frame searching, either or both of the coincidence circuits 58,60 would not get set to their ONE states, causing the gate 70 to set the flip-flop 40 to its ONE state, thereby causing the motor 18 to stop (to prevent futile frame searching), and causing an alarm or similar device to be actuated.

Assuming, again, that the microfilm strip in question is of interest (and causes ONE's to occur at the outputs of the coincidence circuits 58,60) the strip continues to be positioned at low speed by the motor 18. As soon, however, as three successive output words from the buffer register 56 are the same as the words appearing in the registers 30,32,34, AND gates 72,74 cause gates 76 to open so that the address word corresponding to the frame descriptor data which has been just read may be fed into a buffer register 78. (Whereas an AND circuit 72 has been indicated, such circuit may, for example, be an OR circuit which produces an output whenever any, or a combination of, selected frame descriptor information has been read by the head 48.)

All the while the motor 18 is being slowly driven (magnetic searching), the address (count) of the particular microfilm frame which occupies the viewing gate is kept track of: A photodetector circuit 80 senses the optical marks 22 adjacent each frame, and applies its output signals to an updown frame counter 82. Thus, the instantaneous frame address count for the frame in the viewing gate may be compared (84) with the address count of the frame which has been selected for viewing, the digital difference between such counts being representative of the direction and amount that the strip must be positioned for the requisite viewing, etc.

The digital difference is converted to analog form by a circuit 86, the output of which resets the flip-flop 42 so that the motor 18 may run at high speed under optical control; and depending on the sense of the analog signal, the flip-flop 44 causes the motor 18 to run either forward or in reverse, to bring the desired frame into view, etc. Gates 88 and a buffer register 90 pass the instantaneous frame address count to the comparator once high speed searching is to occur, i.e. when the AND circuit 74 produces an output; and such gates 88 and buffer register 90 assure that the digital-to-analog converter 86 has no output during slow speed magnetic searching.

As the desired frame approaches the viewing gate, the output of the digital-to-analog converter 86 approaches zero; and when this happens, a zero-volts detector 92 (e.g. a coincidence circuit) triggers to stop the drive of the motor 18. The detector 92 may, if preferred, detect an "approaching" zero voltage, thereby to switch from the optical high speed optical mode to an optical mode that is low speed to facilitate zeroing.

SUMMARIZING the operation of apparatus according to the invention, the microfilm strip 10 is positioned at low speed all the while a search is made for magnetically recorded frame descriptor data; once the frame descriptor data has been found, the address of the frame in question is determined and, under high speed optical control, the strip is indexed to bring the frame in question to a reference location.

Forming no part of the invention — but made possible because apparatus according to the invention does not require special positioning, within the strip 10, of frame descriptor data — is the facility for using available space in the microfilm strip for recording, e.g. by means of system-controlled write electronics 99 and head 101, respective additional information for the various microfilm frames 12. For example, were a given frame to indicate a map, census and other variable data related to such map could be written into the "available" unused part of the stripe 20. Thus, having searched for and found a particular frame as indicated above, the "up-dated" information of the strip 10 could be interrogated, and whereby, say, a printout made of such up-dated information.

Important to the operation of FIG. 1 is the need for accurately knowing at all times the address count of the microfilm frame which is within the viewing gate; and, needless to say, should such count be lost (a matter which would be quite possible, especially at high optical reading speeds), indexing to the address of the desired frame would be impossible. To reduce greatly the chance that the frame address count (of the counter 82) will be wrong, the invention proposes that the counter 82, and the optical mark 22 and photodetector 80 arrangement, of FIG. 1, be replaced by a circuit and mark-and-code arrangement like that indicated in FIG. 3: Relatively wide optical marks 22' are counted by a counter 82' responsive to the output of an AND circuit 100. The AND circuit 100, the purpose of which is to assure that code bits 102 do not step the counter 82', produces an output pulse only when all of a group of photopickups 80' read the frame address count marks 22'. The code 102 — which is read by means of photopickups 103 — is, in this version of the invention, a four-bit binary number that effectively replaces the four least significant binary bits which would appear at the output of the counter 82'. Thus, in order for a wrong frame count to be produced, the count of the counter would have to be off by binary 1111 (decimal 16), a highly unlikely occurrence; and for even greater assurance, additional optical bits/tracks may be employed in the manner described above.

FIG. 4 illustrates a variation of the circuit of FIG. 3, though with fewer least significant counter (82") stages replaced by a code count 102". By placing the frame count marks 22" in one track, and the code count 102" in its own track, the need for an AND circuit (such as circuit 100) is obviated.

The invention has been described in detail with particular reference to preferred embodiments thereof, but it will be understood that variations and modifications can be effected within the spirit and scope of the invention.

What is claimed is:

1. An automatic searching system for bringing preselected data to a reference location comprising:
  a. a strip having frames of data disposed along the length of said strip,
  b. optically detectable marks positioned along the length of said strip in relationship to respective frames of said strip,
  c. a magnetic recording stripe on said strip, said stripe containing data descriptive of the contents of the said frames,
  d. strip moving for moving said strip so that the frames thereof pass in relation to said reference location, and
  e. means for controlling said strip moving means including;
    1. means for reading the data of said magnetic stripe, and
    2. means for detecting the said optically detectable marks, said means for controlling being operable to drive said strip moving means at a stripe reading speed unitl selected data in said stripe has been read by said stripe reading means, then switching said control means to be responsive to said detecting means whereby a selected frame of data is positioned precisely at said reference location.

2. A searching system comprising:
  a. a strip containing along the length thereof frames of data,
  b. optically readable marks positioned along said strip and in relation to respective frames thereof,
  c. a magnetic recording stripe lengthwise disposed along said strip, said stripe containing data respectively descriptive of the contents of the frames of said strip, and counts representative of their respective locations,
  d. strip moving means for positioning the strip so that the frames thereof successively move past a reference location,
  e. means for counting the optically readable marks which pass the said reference location, thereby to determine continually the location, along the length of said strip, of the frame instantly occupying the said reference location,
  f. means for reading the data of said magnetic recording stripe,
  g. means cooperative with said means for counting for also registering the frame location count of a desired frame and for comparing the count of said counting means with the count of said desired frame location, and
  h. means cooperative with said strip moving means to move said strip first at a stripe reading speed and, in response to registering the count of said desired frame, moving said strip at a different speed until the registered count and the count of the counter are the same.

3. The system of claim 2 wherein said strip has associated with each optically readable mark a binary count of $n$ bits, said binary counts successively increasing from the lead end of said strip, and cyclically repeating each time all of the bits in any given binary count are ONE's, and wherein said counting means comprises:
  a. means for reading said binary count,
  b. a binary counter for counting the optically readable marks which pass the said reference location, and
  c. means for receiving the outputs of all but the least significant n stages of said counter, and for substituting the outputs of said binary count reading means for said least significant $n$ stages, thereby to provide a more assuredly accurate address count for the frame at the said reference location.

4. The system of claim 3 wherein said binary counts of n bits appear on said strip in optically readable form.

5. Apparatus for use with a strip of microfilmed data disposed in frames along the length of said strip, said strip having optically readable marks adjacent each frame, and a magnetic recording stripe disposed lengthwise of said strip for storing frame descriptor and frame address count data for respective frames of said strip, comprising:
  a. strip moving for positioning said strip so that the frames thereof move successively past a reference location,
  b. means responsive to said optically readable marks for counting the frames which pass said reference location,
  c. means for selecting descriptor data of at least one frame within said strip,
  d. means for searching said magnetic recording stripe for said selected descriptor data and for registering the frame address count data associated with said selected descriptor data, means for comparing the count of said counting means with said registered address count and producing an output in response to a difference therebetween, and
  e. means responsive to said searching means for operating said strip moving means at a stripe reading speed until said frame address has been registered, and thereafter operating said strip moving means at a different speed dependent upon and under control of the output of said count comparing means.

6. The apparatus of claim 5 wherein said strip is provided with cyclically repeating sets of binary counts, increasing in value away from the lead end of said strip, and each count of each set having n bits and being associated with a respective optically readable mark, and wherein said counting means comprises:

a. a binary counter for counting the said optically readable marks,
b. means for reading the binary counts on said strip, and
c. means for substituting the output of said count reading means for the least significant *n* stages of said counter, whereby those counter stages adapted to register the most significant bits, in combination with the least significant count bits read by said count reading means, quite assuredly represents the address count of the frame appearing at said reference location.

7. The apparatus of claim 6 wherein said binary counts of n bits appear on said strip in optically readable form.

* * * * *